Dec. 23, 1924. 1,520,643
C. A. GODSHALK
LOCKING MEANS FOR THE STEERING MECHANISM OF MOTOR VEHICLES
Filed Jan. 16, 1923 2 Sheets-Sheet 1
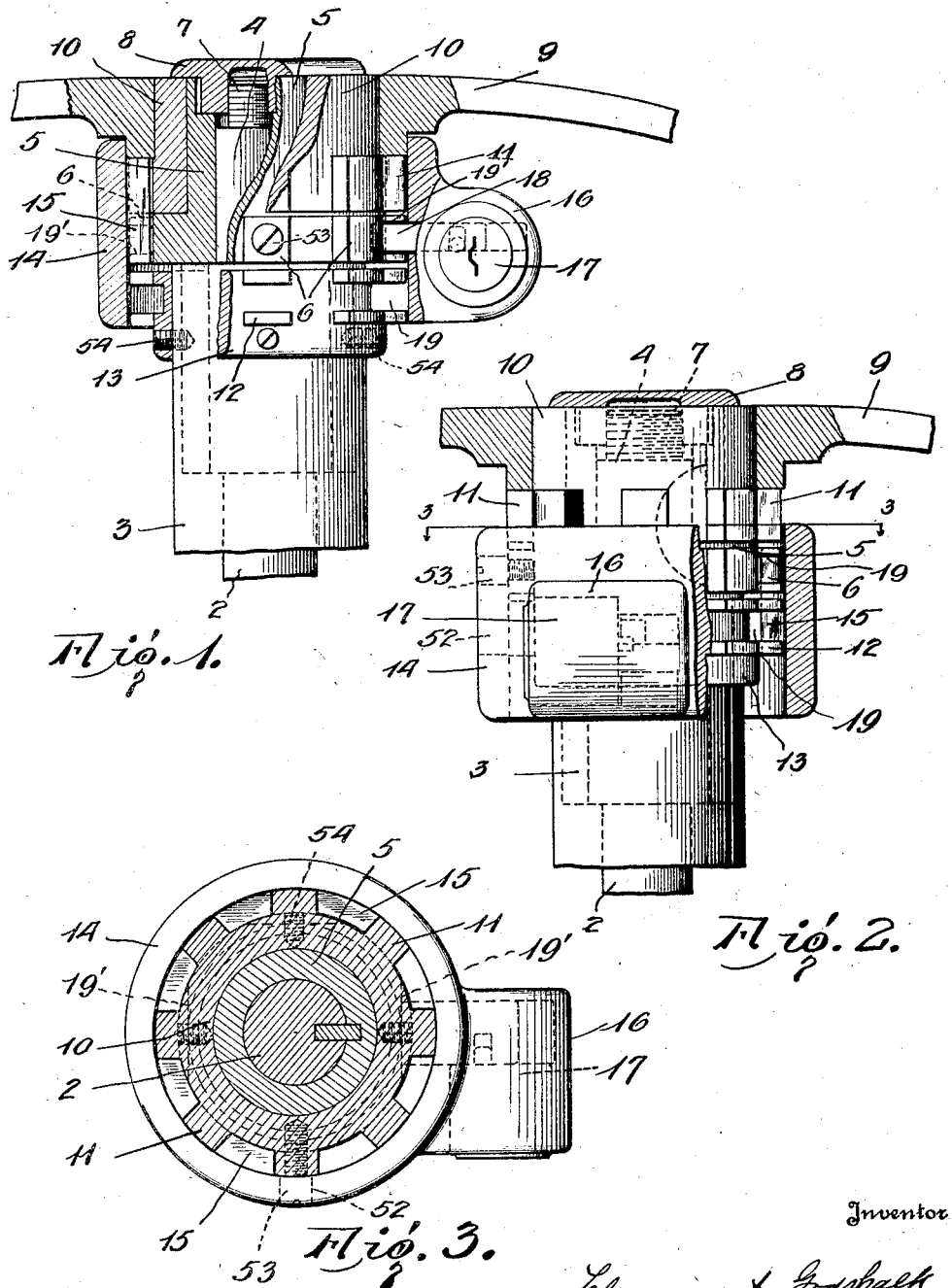
Inventor
Clarence A. Godshalk
By John S. Barker
Attorney

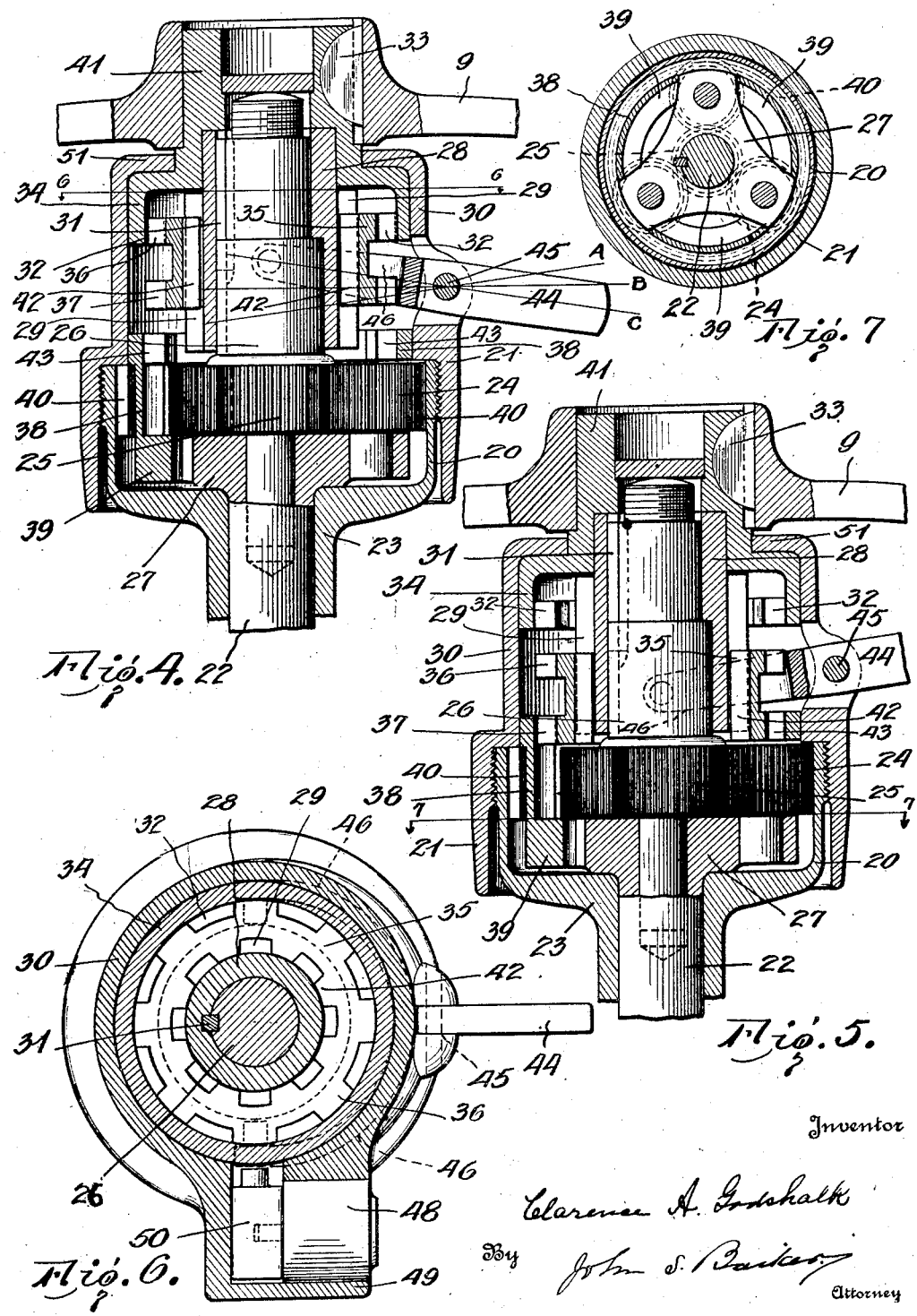

Patented Dec. 23, 1924.

1,520,643

UNITED STATES PATENT OFFICE.

CLARENCE A. GODSHALK, OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE.

LOCKING MEANS FOR THE STEERING MECHANISM OF MOTOR VEHICLES.

Application filed January 16, 1923. Serial No. 612,983.

*To all whom it may concern:*

Be it known that I, CLARENCE A. GODSHALK, a citizen of the United States, residing at Philadelphia, in the county of Philadelphia and State of Pennsylvania, have invented certain new and useful Improvements in Locking Means for the Steering Mechanism of Motor Vehicles, of which the following is a specification.

There are two general types of locking mechanism for the steering wheels of automobiles now in somewhat common use. In one type the locking of the car is effected by connecting the steering wheel with some rigid part of the car, the wheel in the meantime remaining in working engagement with the steering shaft, with the result that no part of the steering mechanism can be turned until the lock is released, the front wheels of the vehicle being thus held fixedly in the position which they may occupy when the steering mechanism is locked. In another type of mechanism the hand steering wheel has a connection with the steering shaft through locking means of such nature that when the lock is in one position the two parts just referred to are rigidly united, but when in another position they are disconnected, permitting the steering wheel to turn freely with reference to the shaft and without imparting motion thereto. There are advantages incident to each type of locking mechanism, and likewise certain disadvantages are incident to each. The present invention has for its object to combine in a single apparatus certain of the advantages peculiar to each of the above described types of locking mechanism for steering apparatus, and to this end it consists of locking means which, when set to one position unite the steering wheel with the steering shaft, thereby putting the steering mechanism into working condition, and when adjusted to another position disconnect the steering wheel from the steering shaft, leaving the former perfectly free to turn relative to the latter, and at the same time lock the steering shaft against rotation, thereby preventing the turning of the front or steering ground wheels of the vehicle. It will thus be seen that a single movement of the locking mechanism into one position puts the parts of the steering mechanism into working relationship, while a movement into another position frees the hand steering wheel from driving connection with the steering shaft and also locks the steering shaft against rotation.

In the accompanying drawings I have illustrated two forms of the invention, one adapted for use with the well known forms of steering mechanism operating through worm gearing, and the other adapted for use in connection with steering mechanism provided with planetary gearing such as is now commonly found upon Ford cars.

Fig. 1 is a vertical sectional view of locking means for the steering mechanism of an automobile of a type that is not equipped with planetary gearing at the head of the stationary column through which passes the steering shaft, the parts being in driving position.

Fig. 2 is a view similar to Fig. 1 with parts adjusted to locking position.

Fig. 3 is a transverse sectional view taken on the line 3—3 of Fig. 2.

Fig. 4 is a vertical sectional view of my invention adapted for use in connection with a steering gear mechanism of the planetary gear type, the parts being represented in driving position.

Fig. 5 is a view similar to Fig. 4 except that the parts are represented as having been adjusted to locking position.

Fig. 6 is a transverse sectional view on the line 6—6 of Fig. 4.

Figure 7 is a transverse sectional view on the line 7—7 of Fig. 6.

Referring to that form of the invention illustrated in Figs. 1, 2 and 3, 2 indicates the steering shaft of an automobile supported so that it may oscillate in a stationary column 3. The upper end of the steering shaft is formed with a smooth cylindrical reduced portion 4, to which is keyed a short sleeve 5 formed with a cylindrical set of external teeth 6. Beyond the smooth reduced portion 4 of the steering shaft is a screw-threaded portion 7 with which engages the nut 8 that serves to hold the steering wheel 9 in place upon the steering shaft. In the hub of the steering wheel and secured fast thereto by a key is a short sleeve 10 the inner end of which is formed with a circular set of external teeth 11, the two sets of teeth 6 and 11 being of the same form and size. The sleeve 10 carried by the steering wheel fits upon a smooth cylindrical part of the sleeve 5, which serves as a support therefor, and on which it is free to turn. The sets of teeth 6 and 11, which respectively form gear wheels, lie superposed one directly over the other and in close relationship so they may be easily connected. A third set of external gear teeth 12 is carried by a sleeve 13 secured fast to the stationary column 3 by the screws 54, the gear formed by the teeth 12 being of the same size and shape as the gear wheels 6 and 11 and located close to the gear wheel 6, but on the side opposite to that occupied by the gear wheel 11.

14 indicates a sleeve free to move in vertical directions, that is to say, on lines parallel with the axis of the shaft 2 and carrying a set of internal teeth 15 adapted to mesh with teeth, 6, 11 and 12. The internal teeth 15 are of such width that they may have full working engagement at one and the same time two of the external sets of teeth, either 6 and 11, or 6 and 12, accordingly as the sleeve 14 is adjusted. In Fig. 1 the teeth 15 engage with the teeth 6 and 11, this being the position occupied when the parts are in operating or driving relationship, while in Fig. 2 the teeth 15 are in engagement with the teeth 6 and 12 and the steering mechanism is locked. When the parts are in the positions indicated in Fig. 1 the steering wheel 9 is connected with the shaft 2 in such way that movements of the former are directly communicated to the latter through the sleeve 10 and its teeth 11, the connecting teeth 15 of the sleeve 14, and the teeth 6 of the sleeve 5 keyed to the steering shaft. When the sleeve 10 is adjusted so that it occupies the position indicated in Fig. 2 the connecting teeth 15 have been moved from engagement with the teeth 11, leaving the hand steering wheel 9 free to turn without imparting any movement to the steering shaft. At the same time that the hand steering wheel is thus freed, the shaft 2 is rigidly connected or locked with the stationary column 3, through the connecting gear 15, which now engages with the gear teeth 6 carried by the steering shaft and the gear teeth 12 carried by the stationary column 3.

When the sleeve 14 is adjusted to the position represented in Fig. 2 its lower portion overlies the sleeve 13 so as to cover and conceal the screws 54 by which said sleeve 13 is secured to the stationary column 3, thus making it impossible to remove these screws so long as the mechanism is locked. This very much adds to the security afforded by the locking mechanism.

The sleeve 14 may be operated by hand or by mechanism connected therewith, the form of the invention shown in Figs. 1 and 2 being without any manipulating mechanism, as the sleeve is accessible and can be adjusted by hand.

A key-operated lock 17 is arranged for holding the adjustable sleeve in the operative positions to which it may be moved. The body of the lock, which may be of varied kinds, is mounted in a socket or recess formed therefor in a projection 16 of the adjustable sleeve 14. The lock is constructed to operate a bolt 18 supported so as to be movable upon lines radial to the steering shaft and the toothed gears concentric thereto which have been described. The inner end of the bolt 18 is adapted to enter recesses or seats 19, 19' provided therefor. The seats 19, are formed in the teeth 12 of the stationary sleeve 13. The bolt 18 is projected by the lock into one of these seats or recesses 19 whenever the parts have been adjusted to the position indicated in Fig. 2, and it is desired that the parts should remain in locked position until released by one possessing a key for the lock 17. When the sleeve 14 is raised to the position shown in Fig. 1, the driving position, the bolt is shot into one of the seats or recesses 19', thus holding the parts in working position until released by the manipulation of the lock.

In order to limit the movements of the sleeve 14 along vertical lines, that is, lines parallel with the axis of the driving shaft, so that it shall always be arrested with the end of the locking bolt opposite the plane of the bolt seats, I form in the sleeve a slot 52 through which extends a pin 53 carried by the gear wheel that is attached to the steering shaft 2, being preferably seated in one of the teeth 6 thereof.

Referring now to Figs. 4 to 6 in which I illustrate my invention applied to a Ford planetary steering gear, 22 indicates the steering shaft, which is mounted within the stationary steering post 23 and is provided at its upper end with a head 27 carrying the intermediate planetary pinions 24, usually three in number, which engage on one side with the central drive pinion 25, and on the other side with the internal gear 40 formed on the inside of the gear case 20 at the upper end of the stationary steering post or column 23. The gear case is provided with a skirted cap 21 as is usual, which, however, differs from that of the ordinary Ford gear case in having an extension 30 constituting a housing for the locking mechanism that I shall describe. The drive pinion 25 is at the lower end of a stub shaft 26 on the upper end of which the hand steering wheel 9 is supported, although not directly. A sleeve 28 provided on its inner or lower end with external teeth 29, is secured to the stub shaft 26 by a key 31 so that these two parts always turn together. Within the hub of the hand steering wheel 9 and united thereto by key 33, is a cylindrical piece 41 provided at its lower end with a skirt 34 from the internal face of which project the teeth 32. The teeth 32 are concentric with, but are spaced from, the upper portions of the teeth 29 carried by the sleeve 28 which is secured to the stub shaft. It will be seen that the skirt 34 and the teeth 32 which it carries always turn with the hand steering wheel 9.

A shifting gear 35, provided with a set of internal teeth 42 that intermesh with the teeth 29, surrounds the sleeve 28 and is adapted to slide along the same, always remaining, however, in gear therewith so that it rotates whenever the stub 26 turns. This shifting gear is provided with two sets of external teeth 36 and 37, preferably spaced apart from each other. The upper set of teeth, 36, are adapted to mesh with the teeth 32 carried by the skirt 34 of the hand steering wheel 9. The lower set of teeth, 37, are adapted to mesh with the internal teeth 43 of a locking gear ring 38 that fits the inner wall of the housing 30, and is adapted to rotate therein. The gear ring 38 is provided with a set of downwardly extending arms 39 which are adapted to lie between the arms of the steering shaft head 27 by which the planetary gear pinions 24 are carried.

44 indicates the handle of a shifter for the sliding gear 35. It is pivotally supported at 45 in the housing 30 and is provided with a yoke 46 on the inside of the housing, the arms of which yoke carry studs uniting the shifter with the sliding gear. The sliding gear may be set into either of three positions through the shifter, the lines A, B and C in Fig. 4 indicating these positions. When the handle is moved to position C, the parts then being in the position represented in Fig. 4, the shifting gear 35 is raised and its teeth 36 are in mesh with the teeth 32 of the skirt of the steering wheel hub. The parts are now in driving position, and any turning movement of the hand wheel 9 will be communicated to the steering shaft 22. This will be understood when it is observed that the teeth 32 of the hub skirt of the steering wheel are in mesh with the teeth 36 of the shifting gear, and the latter is in mesh with the sleeve 28 secured fast to the stub shaft, so that the hand wheel drives the stub shaft through the train of gearing just traced, and as the stub shaft carries the central pinion 25 of the planetary gearing located within the gear case 20, it drives the shaft 22 in a well known manner.

When the handle of the shifter is moved to position B the parts are in neutral position, both sets of teeth, 36 and 37, being free from engagement with the gear teeth with which they are respectively arranged to mesh.

When the handle of the shifter is moved to position A the teeth 37 of the shifting gear come into meshing engagement with the teeth 43 of the locking ring, the teeth 36 at the same time being free from the teeth 32. This position of parts is the locking position and is represented in Fig. 5. By reference to this view it will be seen that the hand steering wheel is now entirely disengaged from the shifting gear and is free to turn upon the sleeve 28 without imparting any movement to the steering mechanism. At the same time the shaft 22 is locked against rotation, as will be apparent, since the locking ring 38 is in rotative connection with both the driving pinion 25 and the shaft head 27; with the former through the teeth 43, the shifter 35, the sleeve 28 with which the shifter is in engagement, and the shaft 26 to which the sleeve is secured, and with the latter through the arms 39 that lie between the arms of the shaft head 27 on which the planetary pinions 24 are supported. Since the drive pinion 25 and the shaft 22 carrying the head 27 rotate at different speeds, if they rotate at all, the fact that they are locked together by a single rigid part insures neither of them can be turned so long as this locking engagement is maintained.

In order that the parts may be locked when adjusted to the position represented in Fig. 5 I have provided a key-operated lock, the casing 48 of which is mounted in a socket 49 formed therefor in the housing 30. This lock controls a bolt 50, the end of which is adapted to engage with one of the arms 46 of the shifter for the sliding gear. The bolt will be projected so as to lie above the arm and hold the parts securely in car-locking position when the shifter is moved to position A. The bolt will be withdrawn to the position indicated in Fig. 6 whenever the shifter is to be moved, and during ordinary driving.

The housing 30 is formed at its upper end with a flange 51 that is adapted to overlie the skirt 34 carried by the steering wheel.

It will be observed by comparison of the two forms of my invention herein illustrated and described that in both the hand steering wheel is supported so as to be free to revolve relative to the turning shaft of the steering mechanism; that the hand wheel is provided with a gear that turns therewith; that the steering shaft is provided with a gear that turns therewith; and that there is a shifting or sliding gear element, always in mesh with the gear of the shaft, and having intermittent meshing engagement, when adjusted to one position, with the gear of the steering wheel, and intermittent engagement, when adjusted to another position, with a locking element that prevents rotation of the shaft. The two mechanisms that I have illustrated are widely different in details, representing as they do my invention applied to two common types of steering mechanisms for motor vehicles that are quite dissimilar, but they have the features above enumerated in common.

The parts designated 14, Figs. 1 to 3, and 35, Figs. 4 to 7, are coupling sleeves concentric with the steering shaft and movable along lines parallel with the steering shaft. These coupling sleeves are each arranged when moved to one position to unite together the hand wheel of the steering gear and the shaft of the steering mechanism, and when moved to another position to disconnect the hand wheel from such shaft and then to constitute an element that locks the steering shaft, positively preventing its rotation.

I do not in this application make specific claim to the form of mechanism illustrated in Figs. 1, 2 and 3, but reserve to myself the right to present the novel subject-matter of such specific mechanism in an application to be filed therefor as a division of this case.

What I claim is:

1. The combination with a steering shaft and a hand wheel for operating it, of means by which the wheel may be connected with the shaft or left free to turn relative thereto, means by which the shaft may be locked against rotation or left free to turn, and shifting means including a sleeve concentric with the steering shaft co-operating with both the said wheel-connecting and the shaft-locking means, and arranged when adjusted to one position, along lines parallel with the axis of the steering shaft to cause the wheel and shaft to be united, and when adjusted to another position to release the wheel from the shaft and at the same time lock the shaft against rotation.

2. The combination with a steering shaft and a hand wheel for operating it, of means by which the wheel may be connected with the shaft or left free to turn relative thereto, means by which the shaft may be held against rotation or left free to turn, and shifting means including a gear element arranged to co-operate with both the said wheel-connecting and shaft-locking means and arranged when adjusted to one position to constitute part of a gear train uniting the shaft and hand wheel, and when adjusted to another position to release the wheel and at the same time to constitute part of a gear connection for locking the shaft against rotation.

3. The combination stated in claim 1, including also a housing for the said connecting, locking and shifting elements, and a manually operated shifter extending through the housing by which the movements of the shifting element are controlled.

4. The combination stated in claim 1, including also a housing for the said connecting locking and shifting elements, a manually operated shifter extending through the housing by which the movements of the shifting element are controlled, and a key-operated lock for maintaining the parts in shaft-locking position.

5. The combination of a shaft, a wheel supported so as to be free to turn relative to the shaft, a gear turning with the wheel, another gear turning with the shaft, a locking element co-operating to prevent rotation of the shaft, and a shifting gear element arranged to be in constant mesh with the gear of the shaft and to have meshing engagement, when in one position, with the gear of the wheel, and meshing engagement, when in another position, with the locking element.

6. The combination of a shaft, a wheel supported thereon so as to be free to turn relative thereto, a gear connected with the wheel so as to turn therewith, another gear connected with the shaft so as to turn therewith, a locking element co-operating to prevent rotation of the shaft, and a shifting gear element having constant meshing engagement with the gear of the shaft, and arranged to have engagement with the gear of the wheel, when adjusted to one position, to operatively unite the wheel and shaft, and, when adjusted to another position, to disengage the gear of the wheel, and at the same time to engage with the locking element, thereby connecting the shaft with the latter.

7. In steering mechanism for motor vehicles, the combination of a stationary column, a steering shaft and a hand wheel supported by the shaft but free to turn relative thereto, of a gear connected with the wheel so as to turn therewith, means for locking the shaft against turning, and an adjustable sliding gear element consisting of a sleeve concentric with the shaft and connected therewith so as to turn with it, the sleeve being provided with a gear adapted to intermesh with the gear carried by the hand wheel when it is adjusted to one position, and arranged when adjusted to another position to free the hand wheel and at the same time to engage with the shaft-locking means.

8. In steering mechanism for motor vehicles, the combination with a steering shaft, a stub shaft, planetary gearing between these shafts, and a hand wheel supported on the stub shaft but free to rotate relative thereto, of connecting and locking mechanism comprising a gear carried by the hand wheel, a locking gear having engagement with the planetary gearing so as to rotate therewith, and a sliding gear having connection with the stub shaft so as to turn therewith but free to slide thereon, and means for adjusting the sliding gear, the latter being arranged when adjusted to one position to have meshing engagement with the gear carried by the hand wheel and when adjusted to another position to disengage from the gear of the hand wheel and to come into meshing engagement with the locking gear.

9. The combination with a steering shaft provided at its upper end with a head, a stationary column in which the shaft is supported, a gear case at the end of the column surrounding the head, a stub shaft provided with a driving pinion, planetary gears in mesh with the driving pinion and supported by the head at the end of the steering shaft, and a hand wheel supported on the stub shaft but free to rotate relative thereto, of a skirt carried by the wheel and provided with internal teeth, a locking ring engaging with the head of the drive shaft and arranged to turn therewith, a sleeve connected with the stub shaft so as to turn therewith, but free to slide thereon, the sleeve being provided with one set of teeth for engaging with the teeth carried by the skirt of the wheel, and another set for engaging with the teeth of the locking ring, and means for shifting the sleeve so as to bring its teeth respectively into engagement either with the teeth connected with the hand wheel or those of the gear ring.

CLARENCE A. GODSHALK.